US010289383B2

(12) United States Patent
Lukkoor et al.

(10) Patent No.: US 10,289,383 B2
(45) Date of Patent: May 14, 2019

(54) CROSS OBJECT SYNCHRONIZATION

(71) Applicant: International Business Machines Corporation, Armonk, NY (US)

(72) Inventors: Anjan G. Lukkoor, Saratoga, CA (US); James D. Spyker, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 15/222,351

(22) Filed: Jul. 28, 2016

(65) Prior Publication Data

US 2018/0032582 A1 Feb. 1, 2018

(51) Int. Cl.
*G06F 17/30* (2006.01)
*G06F 7/08* (2006.01)

(52) U.S. Cl.
CPC .......... *G06F 7/08* (2013.01); *G06F 17/30345* (2013.01); *G06F 17/30377* (2013.01)

(58) Field of Classification Search
CPC .................. G06F 9/466; G06F 11/1407; G06F 17/30377; G06F 9/30087; G06F 17/30575; G06F 17/30371; G06F 17/30353
See application file for complete search history.

(56) References Cited

U.S. PATENT DOCUMENTS

| 6,934,727 B2 | 8/2005 | Berkowitz et al. |
| 7,031,974 B1 | 4/2006 | Subramaniam |
| 8,131,670 B2 * | 3/2012 | i Dalfo ............. G06F 17/30578 707/610 |
| 2013/0318044 A1 | 11/2013 | Pareek et al. |
| 2014/0196055 A1 | 7/2014 | Hu et al. |
| 2017/0116210 A1 * | 4/2017 | Park ................... G06F 17/30088 |
| 2017/0339238 A1 * | 11/2017 | Qin ........................ H04L 67/26 |

FOREIGN PATENT DOCUMENTS

CN 104036025 A 9/2014

OTHER PUBLICATIONS

Kleppmann; "Bottled Water: Real-time integration of PostgreSQL and Kafka"; Printed May 4, 2016; 15 pages; <http://www.confluent.io/blog/bottled-water-real-time-integration-of-postgresql-and-kafka/>.
"Realtime Event Processing in Hadoop with Storm and Kafka"; Hortonworks; Printed May 4, 2016; 4 pages; <hortonworks.com/hadoop-tutorial/simulating-transporting-realtime-events-stream-apache-kafka/>.

* cited by examiner

*Primary Examiner* — Jeff A Burke
*Assistant Examiner* — Cindy Nguyen
(74) *Attorney, Agent, or Firm* — Alexa L. Ashworth; Arnold B. Bangali

(57) ABSTRACT

Embodiments of the present invention provide systems and methods for enabling cross object synchronization. An algorithm is applied in order to obtain a consistent view of multiple Kafka topics. One set of objects are associated with a first Kafka topic and another set of objects are associated with a second Kafka topic. The first Kafka topic and the second Kafka topic are processed as a single Kafka topic which leads to common transactional coordinate points associated with the first and second Kafka topics. The common transaction coordinate point is indicative of a consistent view of the multiple Kafka topics.

17 Claims, 6 Drawing Sheets

```
goalTRANSID= null
ReadingFromTopics.addAllTopicsToList()
TopicsAtGoal.emptyList()

// Keep going while some Topics haven't reached reachedthe goal TRANSID
While ( ReadingFromTopics.listNotEmpty() && message = ReadingFromTopics.getMessageFromAnyTopic())
{
  if message.TRANSID!= null
  {
    if (goalTRANSID== null)
    {
      // create an initial goal
      goal.TRANSID= message.TRANSID
      TopicsAtGoal.add(message.Topic)
      ReadingFromTopics.remove(message.Topic)
    }
    else if (goalTRANSID> message.TRANSID)
    {
      // Ignore it, this topic is still behind the goal
    }
    else if (goalTRANSID== message.TRANSID)
    {
      // another topic reached the goal
      TopicsAtGoal.add(message.Topic)
      ReadingFromTopics.remove(message.Topic)
    }
    else if (goalTRANSID< message.TRANSID)
    {
      // new goal, either the previous goal was missing from this topic, or this topic was already past this goal point before thesearch began, use this new point as the goal
      goalTRANSID= message.TRANSID
      ReadingFromTopics.addAllTopicsToList()
      TopicsAtGoal.emptyList();
      TopicsAtGoal.add(message.Topic)
      ReadingFromTopics.remove(message.Topic)
    }
  }
}
```

FIG. 5

CROSS OBJECT SYNCHRONIZATION

BACKGROUND OF THE INVENTION

The present invention relates generally to the field of data synchronization, and more specifically to utilizing unified data layers.

A unified data layer, stored in Kafka topic format, is a strategy applied by clients to provide access to the data from the clients' systems of record without incurring the security and resources risks which arise from providing direct access to the clients' systems of record and the underlying databases. A data layer may maintain a separate Kafka topic of each object (or table). There are instances of a data layer storing several objects, which derive from the same data table source. Clients may want to perform analysis on these objects. More specifically, clients view these objects at a point which corresponds to a transactional point of the source database.

SUMMARY

According to one embodiment of the present invention, a method for enabling cross object synchronization is provided with the method comprising the steps of: adding, by one or more processors, a zero-based counter, wherein the zero-based counter orders a plurality of transactions occurring with a time stamp value; enabling, by one or more processors, a synchronization of a plurality of objects when consuming data from a unified data layer, wherein the plurality of objects are at least one or more tables; processing, by one or more processors, the plurality of objects in the unified data layer as separate Kafka topics; and responsive to processing the plurality of objects as separate Kafka topics, obtaining, by one or more processors, a common transactional point among the plurality of objects.

Another embodiment of the present invention provides a computer program product for enabling cross object synchronization, based on the method described above.

Another embodiment of the present invention provides a computer system for enabling cross object synchronization, based on the method described above.

BRIEF DESCRIPTION OF THE DRAWINGS

FIG. 5 is an example of an algorithm applied on a unified data layer, in accordance with an embodiment of the present invention.

DETAILED DESCRIPTION

There are instances of a business client desiring to perform analysis on objects within the data layer, while obtaining a consistent view of the objects within the data layer (i.e., a view of the objects at a point which corresponds to a single transactional point of the source database). A computing application consumes changes associated with multiple Kafka topics (one Kafka topic for each object). A Kafka topic is a distributed, partitioned, and replicated commit log service, which provides the functionality of a messaging system with a unique design. The Kafka topic maintains feeds of messages in categories called topics. Producers are associated with processes which publish messages to a Kafka topic. Consumers are associated with processes which subscribe to topics and process the feed of published messages. The Kafka topic is run as a cluster comprised of one or more servers. The producers send messages over the network to the cluster associated with the Kafka topic, which in turn serves the messages to the consumers. Embodiments of the present disclosure provide a mechanism which allows the consumer to ensure the consumer can view multiple Kafka topics at a consistent point. This disclosure provides a method that maintains the strategy of having a single object per Kafka topic while still providing a facility for a computing application to obtain consistent views when required.

A solution as disclosed by the invention involves writing the data associated with multiple objects to the same Kafka topic. This requires any decisions about what consistency may be required by consumers be known ahead of time and used to drive the basic configuration of the unified data layer. A decision may be made that all of the objects for any given source database be delivered to a single topic (i.e., topic per database versus topic versus object). Thus, the consumption of the data by an application becomes more complex. Furthermore, any consumer who may be interested in just a single object incurs the overhead of filtering out all of the messages for the objects which are not of interest.

Figure 1:
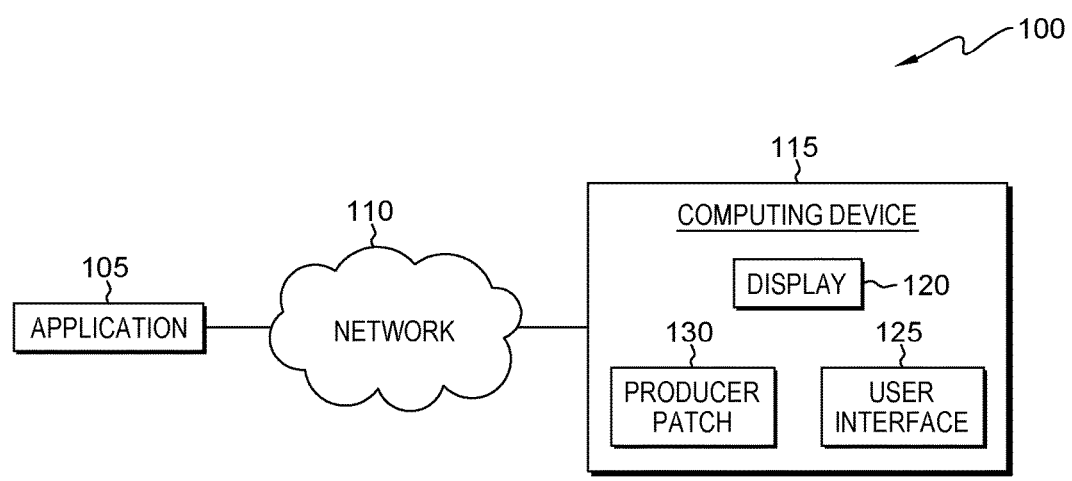
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. FIG. 1 provides only an illustration of implementation and does not imply any limitations with regard to the environments in which different embodiments may be implemented. Modifications to data processing environment 100 may be made by those skilled in the art without departing from the scope of the invention as recited by the claims. In this exemplary embodiment, data processing environment 100 includes application 105 and computing device 115, interconnected by network 110.

Application 105 is a client-server application that the client (or a user interface) runs in a web browser. Application 105 behaves as a computer program designed to perform a group of coordinated functions, tasks, or activities for the benefit of the user. Some of these functions, tasks, or activities include: facilitating online retail sales, hosting online auctions, accessing wikis, and providing webmail and instant messaging services. Application 105 is broken into logical chunks called "tiers", wherein every tier is assigned to a role. Application 105 may be composed of a single tier or multiple tiers. In an exemplary embodiment, there are three tiers which each have an assigned role. A web browser used to run application 105 is the first tier, which performs a "presentation" role. An engine using dynamic Web content technology (such as ASP, CGI, Python, and Java) is the second tier which performs an "application logic" role. A database is the third tier, which performs a "storage" role. The web browser (used to run application 105) sends a request to the second tier by making queries and updates against the database and generating a user interface.

Network 110 can be, for example, a local area network (LAN), a wide area network (WAN) such as the Internet, or a combination of the two, and can include wired, wireless, or fiber optic connections. In general, network 110 can be any combination of connections and protocols that will support communication between computing device 115 and application 105.

Computing device 115 includes display 120, user interface 125, and producer patch 130. Computing device 115 may be a laptop computer, a tablet computer, a netbook computer, a personal computer (PC), a desktop computer, a personal digital assistant (PDA), a smart phone, a thin client, or any programmable electronic device capable of communicating with application 105 via network 110. Computing device 115 may include internal and external hardware components, as depicted and described in further detail with respect to FIG. 6.

User interface 125 may be a graphical user interface (GUI) or a web user interface (WUI), which displays text, documents, web browser windows, user options, application interfaces, and instructions for operation, and includes the information (such as graphics, text, and sound) a program presents to a user and the control sequences the user employs to control the program. User interface 125 is capable of receiving data, user commands, and data input modifications. User interface 125 is also capable of communicating with producer patch 130. In some embodiments, user interface 125 may be integrated with producer patch 130.

In this exemplary embodiment, display 120 may be composed of, for example, a liquid crystal display screen, an organic light emitting diode display screen, or other types of display screens. User interface 125 is viewable within the structure acting as display 120.

In this exemplary embodiment, producer patch 130 is an application which works in conjunction with a unified data layer involving Kafka formats. More specifically, producer patch 130 enables cross object synchronization when consuming data from a unified data layer in Kafka formats. The application of a zero-based counter, by producer patch 130, orders transactions occurring within a same time stamp value. Monotonically increasing TRANSID values are combined with the timestamp and the zero-based counter. This monotonically increasing TRANSID is indicative of an ordering of the transactions. A log based change capture technology is applied by producer patch 130 in order to create a reproducible ordering of the transactions done against a source database and to capture a timestamp corresponding to when a particular transaction took place. Producer patch 130 facilitates the addition of a metadata column of a TRANSID to a schema for each object, wherein the TRANSID is used to contain and identify a particular transaction. The TRANSID column may either be a null value or non-null value. Non-null values indicate all changes up to and including a transaction as indicated by the TRANSID value. These TRANSID values are represented in the messages appearing prior to a current message. Producer patch 130 ensures that a message is added with a common TRANSID value to all topics being processed by producer patch 130, at one or more predetermined coordinate points. Furthermore, consumers ensure a location of a coordinate point by reading to a point in each topic so that a current and as yet unprocessed message for each topic share a common TRANSID value.

A database contains objects such as a table. Transactions are applied against the database, wherein the transaction is an atomic unit of work. Atomic units of works are transactions. These transactions are characterized as all of the data modifications have been performed or none of the data modifications have been performed. A series of transactions is done against a source database, wherein the series of transactions insert, deletes or updates rows into tables. One Kafka topic for one table contains one set of messages, in terms of one set of changed rows. Another Kafka topic for another table contains another set of messages, in terms of another set of changed rows. A Kafka topic may contain a series of rows which derive from the original database. A metadata column is added to the Kafka topic. The metadata column must be added to the scheme for each object deriving from the database in order to contain a transaction ID. The metadata column from this point on will be referred to as the TRANSID column.

Figure 3:
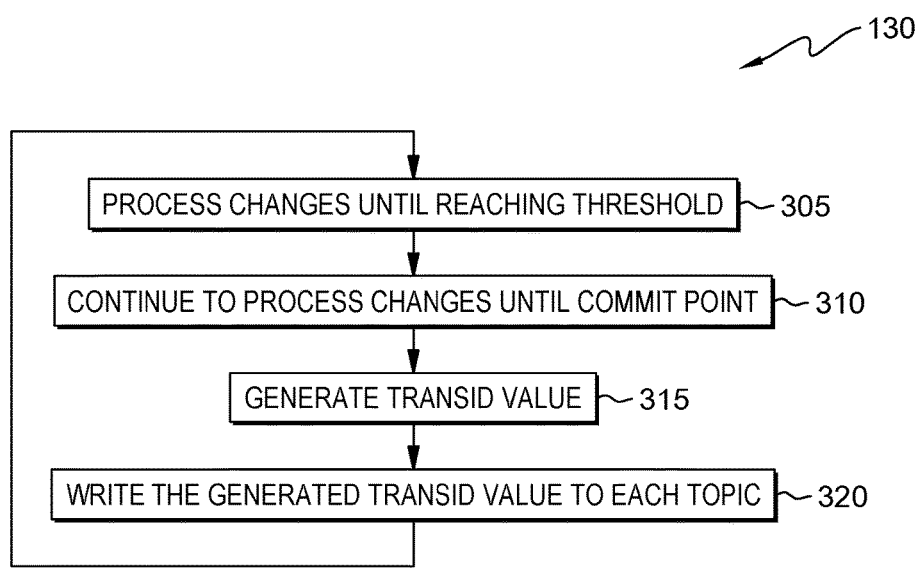
FIG. 3 is a flowchart depicting the operational steps of an implemented strategy of processing a single object per Kafka topic and a consuming application to obtain consistent views, in accordance with an embodiment of the present invention.

Note: Some source transactions may not necessarily influence all of the tables and accordingly, the associated TRANSID values (to these types of source transactions) will not exist in all topics. It may prove to be impractical for a consumer to able to only synchronize transactions at a point where a transaction was executed, and that affected all of the database tables which the consumer wants to coordinate. FIG. 3 describes an algorithm to generate TRANSID value which can be found across all Kafka topics to create a guaranteed synchronization point across all topics.

Figure 2:
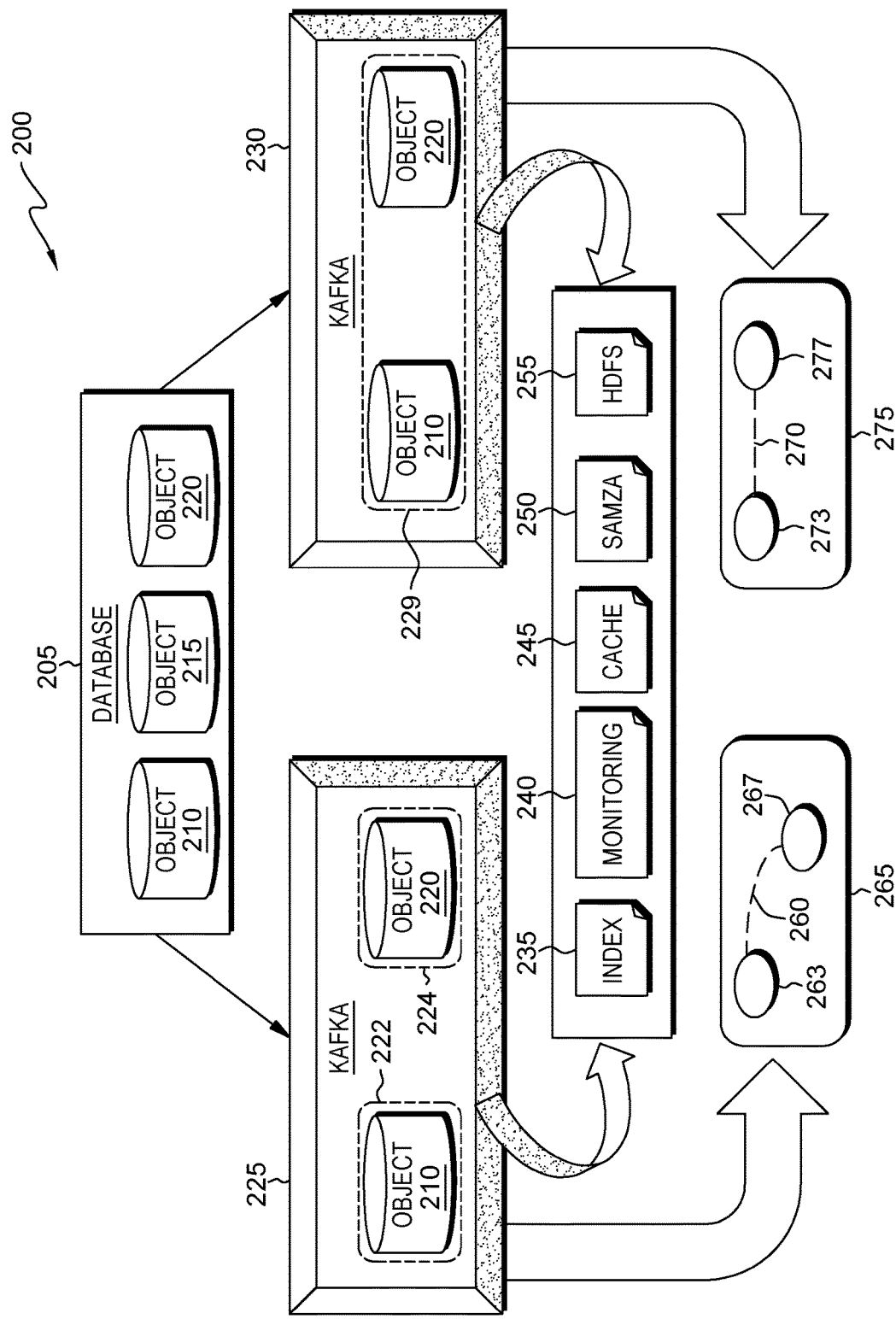
FIG. 2 is a functional block diagram illustrating the resultant views of a unified data layer, in accordance with an embodiment of the present invention.

FIG. 2 is a functional block diagram illustrating the resultant views in a unified data layer, in accordance with an embodiment of the present invention.

Environment 200 illustrates a web application writing a database with objects. In this exemplary embodiment, application 105 is not performing dual writes. When not performing dual writes, application 105 writes to database 205, updates/invalidates appropriate entries in cache 245, and re-indexing data in index 235. Dual writes are prone to gradual data corruption, which is difficult to remedy. Instead, in this exemplary embodiment, a replication approach is applied. During the replication, application 105 only writes to database 205; snapshots from database 205 are taken, wherein one snapshot is associated with one time and another snapshot is associated with another time; and the differences between two snapshots are processed to determine changes in database 205 over time. These changes to database 205 become a data stream. The modification of database 205, by writing in new objects or entering or deleting data, is referred to as a message in the data stream. The application of these messages to another database in the same order, as the original database (i.e., database 205 in this exemplary embodiment) committed these messages, results in an exact copy of the original database. The replication approach to data synchronization performed by producer patch 130 extracts: (i) a consistent snapshot at one point in time from database 205; and (ii) a real-time stream of changes in comparison to an earlier point in time. This replication approach to building systems is a form of capture technology.

In this exemplary embodiment, database 205 contains objects 210, 215, and 220. Objects 210, 215, and 220 contain metadata and are characterized by extended metadata. A unique identifier, which is assigned to each object, allows a server or an end-user consumer to retrieve the object without needing to know the physical location of the object.

In this exemplary embodiment, objects 210 and 220 are stored in unified data layers in the forms of Kafka 225 and Kafka 230. Both Kafka 225 and Kafka 230 contain the same objects as each other and yield data within index 235, monitoring 240, cache 245, Samza 250, and HDFS 255, which may be consumed by an end-user. HDFS is an acronym which stands for Hadoop Distributed File System. Kafka 225 and Kafka 230 are examples of a Kafka-based messaging system which facilitates the transportation of high-volume activity events, such as web server logs and user click events. This type of data, which derives from the events, are typically retained for a certain period of time and discarded after this period of time. Kafka enables log compaction and thus, there is no time-based expiry of data. Every message has a key, and Kafka retains the latest message for a given key indefinitely. A snapshot from database 205 turns every row in database 205 into a message sent to Kafka 225 and Kafka 230. Another snapshot from database 205 or every row in database 205 which is inserted, updated, or deleted, is turned into a message. The methods and systems as enabled by producer patch 130 are not applied on Kafka 225, and thus results in multiple processed Kafka topics. In contrast, the methods and systems as enabled by producer patch 130 are applied on Kafka 230, and thus results in a single processed Kafka topic. The number of dotted boxes correspond to how object 210 and object 220 are written to a Kafka topic, wherein each dotted box represents a processed Kafka topic.

In Kafka 225, two separate Kafka topics are processed for the stored objects. The data of object 210 and object 220 are written to Kafka topic 222 and Kafka topic 224, respectively. Kafka 225 receives the extracted changes deriving from the snapshots of database 205 and the comparison of the snapshots of database 205. There are two dotted boxes—Kafka topic 222 and Kafka topic 224—which is indicative of two separately processed Kafka topics. In an exemplary embodiment, an end-user of application 105 is: performing analysis on object 210 and object 220; desires to see object 210 and object 220 at a point which corresponds to a single transactional point of database 205 (i.e., the source database); and obtains transaction-coordinate correlation 265. Producer patch 130 is not applied and thus, the two separately processed Kakfa topics—Kafka topic 222 and Kafka topic 224—lead to transaction-coordinate correlation 265 (and not to transaction-coordinate correlation 275). Even without the application of producer patch 130, Kafka 225 yields index 235, monitoring 240, cache 245, Samza 250, and HDFS 255. Kafka 230, which applies producer patch 130, also yields index 235, monitoring 240, cache 245, Samza 250, and HDFS 255.

In Kafka 230, object 210 and object 220 are associated with a first Kafka topic and a second Kafka topic, respectively. The data of object 210 and object 220 are written to Kafka topic 229. Kafka 230 receives the extracted changes deriving from the snapshots of database 205 and the comparison of the snaps of database 205. There is a single dotted box—Kafka topic 229—which is indicative of two separately processed Kafka topics. In an exemplary embodiment, an end-user of application 105 is performing analysis on object 210 and object 220. In an exemplary embodiment, an end-user of application 105 is: performing analysis on object 210 and object 220; desires to see object 210 and object 220 at a point which corresponds to a single transaction point of database 205 (i.e., the source database); and obtains transaction-coordinate correlation 275. Producer patch 130 is applied and thus enables the singly processed Kakfa topic—Kafka topic 229—leads to transaction-coordinate correlation 275 (and not to transaction-coordinate correlation 265). Kafka 230, which applies producer patch 130, yields index 235, monitoring 240, cache 245, Samza 250, and HDFS 255. Even without the application of producer patch 130, Kafka 225 also yields index 235, monitoring 240, cache 245, Samza 250, and HDFS 255.

Transaction-coordinate correlation 265 contains a view of objects 210 and 220 as coordinate 263 and coordinate 267, respectively. Due to the separately processed Kafka topics, a "consistent" view of object 210 and object 220 and accordingly, a single transactional point is not obtained. In transaction-coordinate correlation 265, curved line 260 is used to further illustrate the notion that a single transactional has not been obtained. Curved line 260 has two end points—coordinates 263 and 267—which are not horizontally level with one another (as opposed to coordinates 273 and 277 in transaction-coordinate correlate in 275.) Horizontally level end points are used to depict a common view point has been obtained. When the end points are not level with one another, a common view point of the two objects has not been obtained.

Transaction-coordinate correlation 275 contains a view of objects 210 and 220 as coordinate 273 and coordinate 277, respectively. Due to the singly processed Kafka topic, a "consistent" view of object 210 and object 220 and accordingly, a single transactional point is obtained. In transaction-coordinate correlation 275, straight line 270 is used to further illustrate the notion that a single transactional has been obtained. Straight line 270 has two end points—coordinates 273 and 277—which are horizontally level with one another (as opposed to coordinates 263 and 267 in transaction-coordinate correlate in 265. When the end points are level with one another, a common view point of the two objects has been obtained.

FIG. 3 is a flowchart depicting the operational steps of an implemented strategy of maintaining a single object per Kafka topic and a consuming application to obtain consistent views, in accordance with an embodiment of the present invention.

In step 305, producer patch 130 processes changes until reaching a threshold. While processing these changes within the Kafka topic, producer patch 130 captures a time stamp. Producer patch 130 has log-based change capture technology, which creates a reproducible ordering of transactions done against a source database (as written by application 105 in FIG. 1). Furthermore, the change capture technology captures a time stamp corresponding to when that transaction was committed. The time stamp does not have enough granularity to uniquely identify the ordering of transactions and many transactions may be committed at the same time. Producer patch 130 utilizes a zero-based counter to order the transactions occurring within the same timestamp value. The zero-based counters create monotonically increasing values, which are indicative of the ordering of the transactions and used to uniquely identify transactions. The zero-based sequencer is a utility acting as a sequencer value. Producer patch 130 may add messages for all the tables which flag a common source transaction point across all topics. Such common transactions points are referred to as the coordinate points. Producer patch 130 determines whether a threshold has been met. The threshold is a predefined value based on the numbers of messages within a table and elapsed times among the messages. The threshold is used to determine when a coordinate point needs to be added by producer patch 130. When the threshold is met, producer patch 130 generates a coordinate point.

In step 310, producer patch 130 continues to process the changes until the commit point. The commit point is indicative of the end of transactions performed against the database. As producer patch 130 processes the changes, producer patch 130 writes entries to the Kafka topic. All of these written entries have a null TRANSID value.

In step 315, producer patch 130 generates a TRANSID value. The TRANSID value within the TRANSID column may be a null value or a non-null value. Often, the TRANSID value is a null value. The non-null value indicates all changes up to, and including the transaction indicated by the TRANSID, have been represented in messages prior to the currently processed transaction. In an exemplary embodiment, the message has a TRANSID value which is indicative that the message is part of a transaction occurring after the transaction represented by the TRANSID value.

In step 320, producer patch 130 writes the generated TRANSID value to each topic. By corresponding TRANSID values to coordinate points, producer patch 130 allows these TRANSID values to become flagged in such a way as to allow a consumer to easily identify messages within the Kafka topic. Producer patch 130 handles a coordinate point by reading each of the associated topics to find the last message written within a topic. Producer patch 130 sends back a copy of that message to the topic with the generated TRANSID value corresponding to the coordinate point. There are variations in the algorithm, wherein producer patch 130 may maintain a cache of the most recent message to avoid having to reread the topic. In an alternate embodiment, producer patch 130 may leverage an operation on that topic which appears in the next transaction being processed. Those variations can provide some improved performance but have no basic effect on the algorithm being discussed. From the example above, if producer patch 130 hits a coordinate point at the start of a different transaction from step 320, the resulting table is different from the table in step 320. (See FIG. 4 for a more detailed discussion with respect to resultant tables based on coordinate points.) Note: The inserted rows with duplicate data information do not impact the usability of the data to end-user consumers.

In another embodiment, the TRANSID value for existing rows in tables is added at coordinate points. The TRANSID value is added as a "dummy" row, where all other fields are null or default values. Such dummy rows are easily identified. The "dummy" rows are the only rows with a non-null TRANSID value. If the topic is partitioned by key values, producer patch 130 adds coordinate point records into each partition. The coordinate point record, for each partition, duplicates the key of the last "dummy" row added to that partition. The coordinate point associated with the "dummy" row has a non-null TRANSID value and the real row does not have a non-null TRANSID value. Thus, these "dummy" rows may be easily distinguishable from the "real" row with that key value. If there is a requirement that rows in a topic must be unique, the TRANSID field may be appended to the table primary key.

There does not need to be any ACID (atomicity, consistency, isolation, and durability) characteristics (to guarantee that database transactions are processed concurrently) between these operations being performed on the individual topics at a coordinate point. In the case where a consumer end-users can identify TRANSID values which indicate a coordinate point, the consumer cannot make the assumption that the consumer will find that TRANSID value in every topic. In the case of an unexpected failure of producer patch 130, the desired TRANSID value may not exist. In this case, the consumer may not be able to flag and identify the coordinate point. Thus, the consumer end-users find a different coordinate point to analyze.

Figure 4:
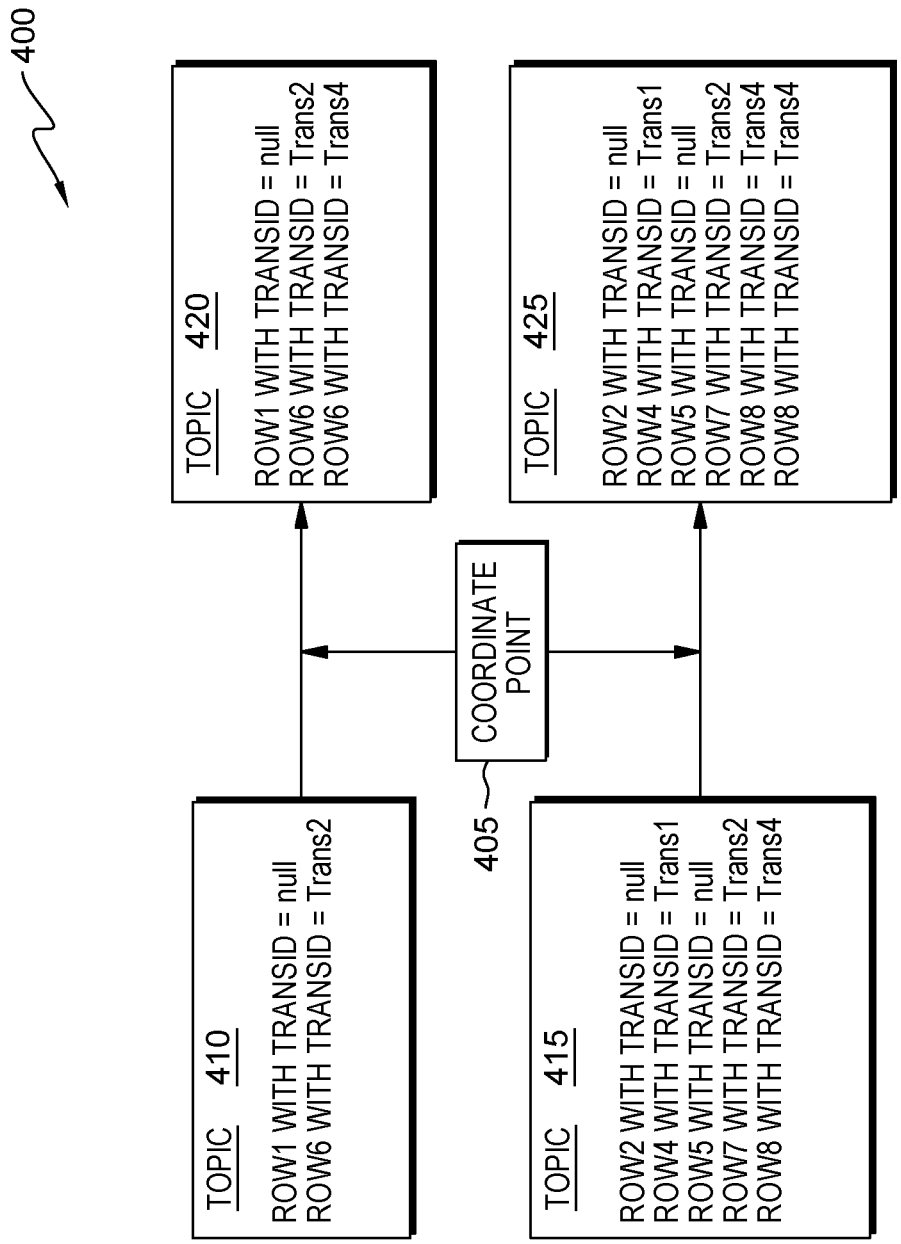
FIG. 4 depicts examples of the resultant tables prior to the application of coordinate points and after the application of coordinate points, in accordance with an embodiment of the present invention.

FIG. 4 depicts examples of the resultant tables prior to the application of coordinate points and after the application of coordinate points, in accordance with an embodiment of the present invention.

Environment 400 depicts: (i) a table for topic 410 becoming a table for topic 415 after applying coordinate point 405; and (ii) a table for topic 415 becoming a table for topic 425 after applying coordinate point 405.

The source transactions for the tables of topic 410 and topic 415 are: (i) transaction 1 to insert ROW1 into topic 410 and insert ROW2 into topic 415; (ii) transaction 2 to insert ROW4 and insert ROW5 into topic 415; (iii) transaction 3 to insert Row6 into topic 410 and insert Row7 into topic 415; and (iv) transaction 4 to insert Row8 into topic 415.

The table for topic 410 (prior to the application of coordinate point 405) contains the messages: "ROW1 with TRANSID=null" and "ROW6 with TRANSID=Trans2".

The table for topic 415 (prior to the application of coordinate point 405) contains the messages: "ROW2 with TRANSID=null"; "ROW4 with TRANSID=Trans1"; "ROW5 with TRANSID=null"; "ROW7 with TRANSID=Trans2"; and "ROW8 with TRANSID=Trans4".

Coordinate point 405 is processed and applied after the final transaction of topic 415 (i.e., "ROW8 with TRANSID=Trans4"). The table for topic 420 (after the application of coordinate point 405) contains the messages: "ROW1 with TRANSID=null"; "ROW6 with TRANSID=Trans2"; and "ROW6 with TRANSID=Trans 4". The table for topic 425 (after the application of coordinate point 405) contains the messages: "ROW2 with TRANSID=null"; "ROW4 with TRANSID=Trans1"; "ROW5 with TRANSID=null"; "ROW7 with TRANSID=Trans2"; "ROW8 with TRANSID=Trans4"; and "ROW8 with TRANSID=Trans4".

The difference between the message content of topic 410 and topic 415 after the application of coordinate point 405 is the addition of message: "ROW6 with TRANSID=Trans4" to the table of topic 415. Coordinate point 405 is applied after "TRANS 4", and thus "ROW6 with TRANSID=Trans4" is added to topic 415. Likewise, the difference between the message content of topic 420 and topic 425 after the application of coordinate point 405 is the addition of message: "ROW8 with TRANSID=Trans4" to the table of topic 425. Coordinate point 405 is applied after "TRANS4", and thus "ROW8 with TRANSID=Trans4 is added to topic 425.

FIG. 5 is an example of an algorithm 500 applied on a unified data layer, in accordance with an embodiment of the present invention.

Algorithm 500 is applied to consume Kafka topics to reach a consistent point (i.e., a common transactional point). A consuming application may have separate threads reading and processing each Kafka topic for better scalability and performance. There may be instances, the consuming application goes back to a slower model of having a single thread reading all of the topics as to allow algorithm 500 to reach a coordinated point. Note: there are instances when the consumer wants to process these topics using independent uncoordinated threads. Algorithm 500, as depicted, single threads the reading, and the consumer may only fall into this essentially single-threaded model at occasional thresholds or because of an end-user request to provide a consistent point.

Figure 6:
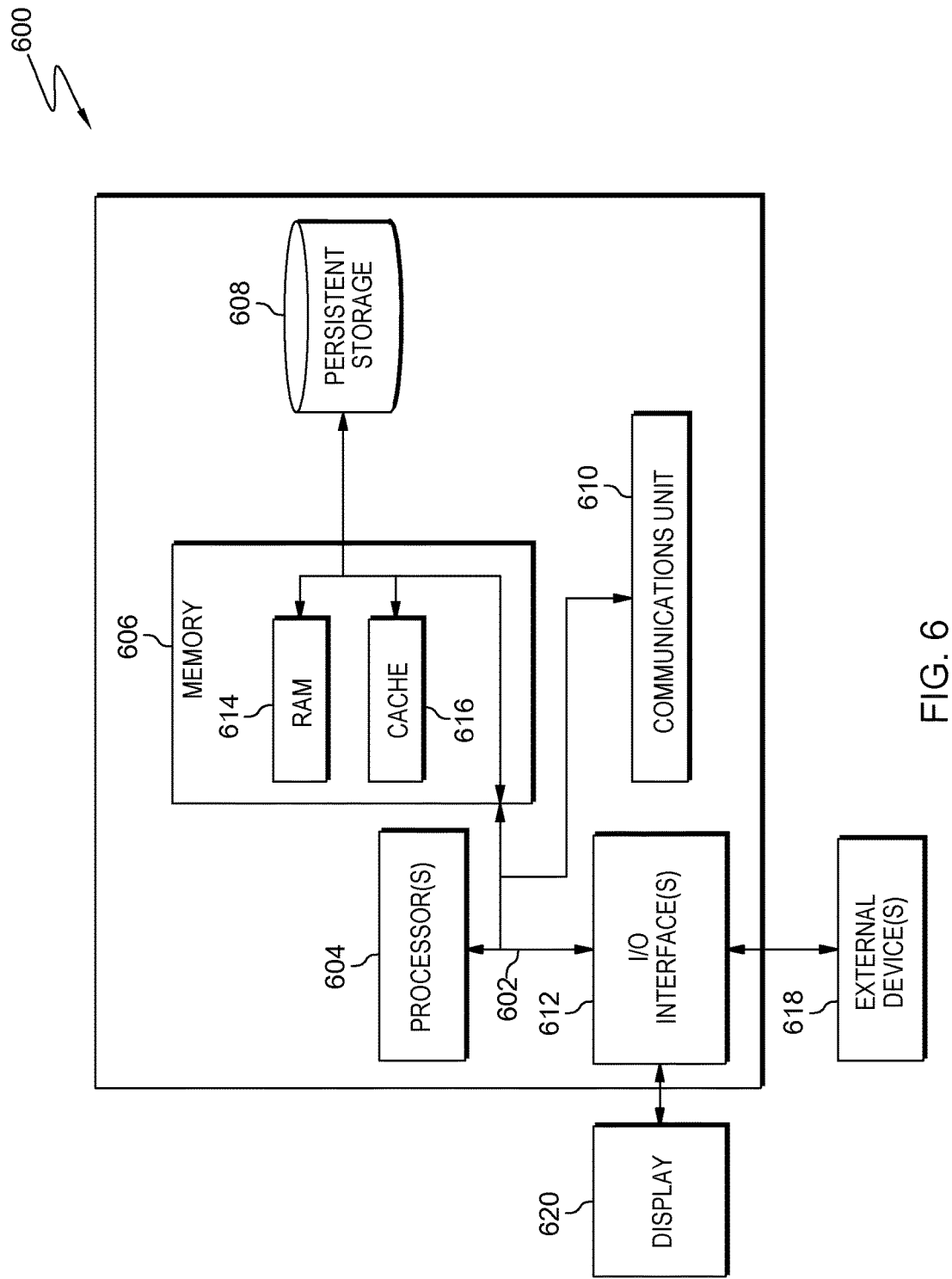
FIG. 6 depicts a block diagram of internal and external components of a computing device, in accordance with an embodiment of the present invention.

FIG. 6 is a block diagram of internal and external components of a computer system 600, which is representative of the computer systems of FIG. 1, in accordance with an embodiment of the present invention. It should be appreciated that FIG. 6 provides only an illustration of one implementation and does not imply any limitations with regard to the environments in which different embodiments may be implemented. In general, the components illustrated in FIG. 6 are representative of any electronic device capable of executing machine-readable program instructions. Examples of computer systems, environments, and/or configurations that may be represented by the components illustrated in FIG. 6 include, but are not limited to: personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 600 includes communications fabric 602, which provides for communications between one or more processors 604, memory 606, persistent storage 608, communications unit 610, and one or more input/output (I/O) interfaces 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media. Software (e.g., modeling program, travel optimization program, etc.) is stored in persistent storage 608 for execution and/or access by one or more of the respective processors 604 via one or more memories of memory 606.

Persistent storage 608 may include, for example, a plurality of magnetic hard disk drives. Alternatively, or in addition to magnetic hard disk drives, persistent storage 608 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 608 can also be removable. For example, a removable hard drive can be used for persistent storage 608. Other examples include optical and magnetic disks, thumb drives, and smart cards that are inserted into a drive for transfer onto another computer-readable storage medium that is also part of persistent storage 608.

Communications unit 610 provides for communications with other computer systems or devices via a network. In this exemplary embodiment, communications unit 610 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to a computing device through communications unit 610 (e.g., via the Internet, a local area network or other wide area network). From communications unit 610, the software and data can be loaded onto persistent storage 608.

One or more I/O interfaces 612 allow for input and output of data with other devices that may be connected to computer system 600. For example, I/O interface 612 can provide a connection to one or more external devices 618 such as a keyboard, computer mouse, touch screen, virtual keyboard, touch pad, pointing device, or other human interface devices. External devices 618 can also include portable computer-readable storage media such as, for example, thumb drives, portable optical or magnetic disks, and memory cards. I/O interface 612 also connects to display 620.

Display 620 provides a mechanism to display data to a user and can be, for example, a computer monitor. Display 620 can also be an incorporated display and may function as a touch screen, such as a built-in display of a tablet computer.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for enabling cross object synchronization, the method comprising the steps of:
    adding, by one or more processors, a zero-based counter, wherein the zero-based counter orders a plurality of transactions for a plurality of objects, the plurality of transactions occurring with a time stamp value;
    enabling, by one or more processors, a synchronization of the plurality of objects when consuming data from a unified data layer, based on the transactions ordered by the zero-based counter, wherein the plurality of objects are at least one or more tables;
    processing, by one or more processors, the plurality of objects in the unified data layer as separate Kafka topics; and
    responsive to processing the plurality of objects as separate Kafka topics, obtaining, by one or more processors, a common transactional point among the plurality of objects,
    wherein enabling synchronization of the plurality of objects includes:
        capturing, by one or more processors, a time stamp value associated with each transaction among the plurality of transactions,
        processing, by one or more processors, the separate Kafka topics as a single Kafka topic,
        receiving, by one or more processors, a metadata column of a TRANSID value applied to a schema, wherein the schema is used to contain and identify the plurality of transactions, for the plurality of objects, and
        receiving, by one or more processors, one or more tables associated with the separate Kafka topics, wherein the separate Kafka topics are based on the schema, and wherein the one or more tables contain a plurality of messages.

2. The method of claim 1, wherein adding the zero-based counter, further comprises:
utilizing, by one or more processors, an additional set of information which is added to a timestamp value associated with the zero-based counter;
capturing, by one or more processors, the timestamp value using log based change capture technology, and
wherein the additional set of information creates a monotonically increasing value.

3. The method of claim 1, wherein receiving the additional metadata column of the TRANSID value, further comprises:
responsive to determining the TRANSID value is a first type of value, associating, by one or more processors, a transaction with changes represented in one or more messages appearing prior to a current message.

4. The method of claim 1, further comprising:
synchronizing, by one or more processors, a transaction from the plurality of transactions, at a coordinate point;
responsive to exceeding a threshold, creating, by one or more processors, one or more coordinate points, wherein the threshold measures a number of messages within the one or more tables and an elapsed time among one or more messages; and
adding, by one or more processors, a common TRANSID value to processed Kafka topics at the one or more coordinate points.

5. The method of claim 1, wherein obtaining the common transactional point among the plurality of objects, comprises:
maintaining, by one or more processors, a cache of a most recent message, wherein at least two messages for a Kafka topic share a common TRANSID value.

6. The method of claim 5, wherein the separate Kafka topics are processed using independent uncoordinated threads.

7. A computer program product for enabling cross object synchronization, the computer program product comprising:
a computer readable storage medium and program instructions stored on the computer readable storage medium, the program instructions comprising:
program instructions to add a zero-based counter, wherein the zero-based counter orders a plurality of transactions for a plurality of objects, the plurality of transactions occurring with a time stamp value;
program instructions to enable a synchronization of the plurality of objects when consuming data from a unified data layer, based on the transactions ordered by the zero-based counter, wherein the plurality of objects are at least one or more tables;
program instructions to process the plurality of objects in the unified data layer as separate Kafka topics; and
program instructions to, responsive to processing the plurality of objects as separate Kafka topics, obtain a common transactional point among the plurality of objects,
wherein enabling synchronization of the plurality of objects includes:
program instruction to capture a time stamp value associated with each transaction among the plurality of transactions,
program instructions to process the separate Kafka topics as a single Kafka topic,
program instructions to receive a metadata column of a TRANSID value applied to a schema, wherein the schema is used to contain and identify the plurality of transactions, for the plurality of objects, and
program instructions to receive one or more tables associated with the separate Kafka topics, wherein the separate Kafka topics are based on the schema, and wherein the one or more tables contain a plurality of messages.

8. The computer program product of claim 7, wherein program instructions to add the zero-based counter, further comprise:
program instructions to utilize an additional set of information which is added to a timestamp value associated with the zero-based counter;
program instructions to capture the timestamp value using log based change capture technology, and
wherein the additional set of information creates a monotonically increasing value.

9. The computer program product of claim 7, wherein program instructions to receive the additional metadata column of the TRANSID value, further comprise:
responsive to determining the TRANSID value is a first type of value, program instructions to associate a transaction with changes represented in one or more messages appearing prior to a current message.

10. The computer program product of claim 7, further comprising:
program instructions to synchronize a transaction from the plurality of transactions, at a coordinate point;
responsive to exceeding a threshold, program instructions to create one or more coordinate points, wherein the threshold measures a number of messages within the one or more tables and an elapsed time among one or more messages; and
program instructions to add a common TRANSID value to processed Kafka topics at the one or more coordinate points.

11. The computer program product of claim 7, wherein program instructions to obtain the common transactional point among the plurality of objects, comprise:
program instructions to maintain a cache of a most recent message, wherein at least two messages for a Kafka topic share a common TRANSID value.

12. The computer program product of claim 11, wherein program instructions to process the separate Kafka topics use independent uncoordinated threads.

13. A computer system for enabling cross object synchronization, the computer system comprising:
one or more computer processors;
one or more computer readable storage media; and
program instructions to add a zero-based counter, wherein the zero-based counter orders a plurality of transactions for a plurality of objects, the plurality of transactions occurring with a time stamp value;
program instructions to enable a synchronization of the plurality of objects when consuming data from a unified data layer, based on the transactions ordered by the zero-based counter, wherein the plurality of objects are at least one or more tables;
program instructions to process the plurality of objects in the unified data layer as separate Kafka topics; and
program instructions to, responsive to processing the plurality of objects as separate Kafka topics, obtain a common transactional point among the plurality of objects,
wherein enabling synchronization of the plurality of objects includes:
program instruction to capture a time stamp value associated with each transaction among the plurality of transactions, program instructions to process the separate Kafka topics as a single Kafka topic, program instructions to receive a metadata column of a TRANSID value applied to a schema, wherein the schema is used to contain and identify the plurality of transactions, for the plurality of objects, and program instructions to receive one or more tables associated with the separate Kafka topics, wherein the separate Kafka topics are based on the schema, and wherein the one or more tables contain a plurality of messages.

14. The computer system of claim 13, wherein program instructions to add the zero-based counter, further comprise:

program instructions to utilize an additional set of information which is added to a timestamp value associated with the zero-based counter;

program instructions to capture the timestamp value using log based change capture technology, and wherein the additional set of information creates a monotonically increasing value.

15. The computer system of claim 13, wherein program instructions to receive the additional metadata column of the TRANSID value, further comprise:

responsive to determining the TRANSID value is a first type of value, program instructions to associate a transaction with changes represented in one or more messages appearing prior to a current message.

16. The computer system of claim 13, further comprising:

program instructions to synchronize a transaction from the plurality of transactions, at a coordinate point;

responsive to exceeding a threshold, program instructions to create one or more coordinate points, wherein the threshold measures a number of messages within the one or more tables and an elapsed time among one or more messages; and program instructions to add a common TRANSID value to processed Kafka topics at the one or more coordinate points.

17. The computer system of claim 13, wherein program instructions to obtain the common transactional point among the plurality of objects, comprise:

program instructions to maintain a cache of a most recent message, wherein at least two messages for a Kafka topic share a common TRANSID value.

* * * * *